United States Patent [19]
Striebich

[11] Patent Number: 4,785,631
[45] Date of Patent: Nov. 22, 1988

[54] WASTE-HEAT TURBINE UNIT

[75] Inventor: Helmut Striebich, Karlsruhe, Fed. Rep. of Germany

[73] Assignee: Dr. Ing. H.c.f. Porsche Aktiengesellschaft, Fed. Rep. of Germany

[21] Appl. No.: 76,755

[22] Filed: Jul. 23, 1987

[30] Foreign Application Priority Data

Aug. 29, 1986 [DE] Fed. Rep. of Germany ....... 3629494

[51] Int. Cl.$^4$ .................. F02B 41/10; F02G 5/02
[52] U.S. Cl. ....................... 60/618; 60/624; 122/11; 415/75
[58] Field of Search ............... 60/597, 598, 618, 624; 122/11; 165/86; 415/72, 75, 167

[56] References Cited

U.S. PATENT DOCUMENTS

| | | |
|---|---|---|
| 551,854 | 12/1895 | Desgoffe ............................ 415/75 |
| 979,041 | 12/1910 | Smith ................................ 60/624 |
| 1,038,133 | 9/1912 | Henry ............................ 415/167 X |
| 1,902,439 | 3/1933 | Foss .............................. 415/72 X |
| 2,283,176 | 5/1942 | Birmann . |
| 2,436,246 | 2/1948 | Braga . |
| 2,592,227 | 4/1952 | Yeomans . |
| 3,242,665 | 3/1966 | Flater . |
| 3,609,058 | 9/1971 | Tarsoly ........................... 415/72 X |
| 3,690,302 | 9/1972 | Rennolds ........................... 122/11 |

FOREIGN PATENT DOCUMENTS

| | | |
|---|---|---|
| 2757236 | 6/1979 | Fed. Rep. of Germany . |
| 3326992 | 12/1984 | Fed. Rep. of Germany . |
| 584850 | 11/1924 | France .............................. 122/11 |
| 673932 | 10/1929 | France . |
| 709814 | 5/1931 | France . |
| 797080 | 2/1936 | France . |
| 168230 | 6/1934 | Switzerland . |

Primary Examiner—Michael Koczo
Attorney, Agent, or Firm—Barnes & Thornburg

[57] ABSTRACT

A waste-heat turbine unit is equipped with a rotating cylinder that is formed as a hollow body that carries a blading on its exterior. The blading is subjected to the exhaust gases of an internal-combustion engine that is a component of a drive assembly, particularly for motor vehicles. The blading, that is located adjacent to exhaust gas duct outlets of the internal-combustion engine, extends spirally along the cylinder. As a result, the stability of the cylinder is increased, and the heat transfer from the exterior to the interior of the cylinder is optimized, whereby the utilization of energy is improved.

20 Claims, 2 Drawing Sheets

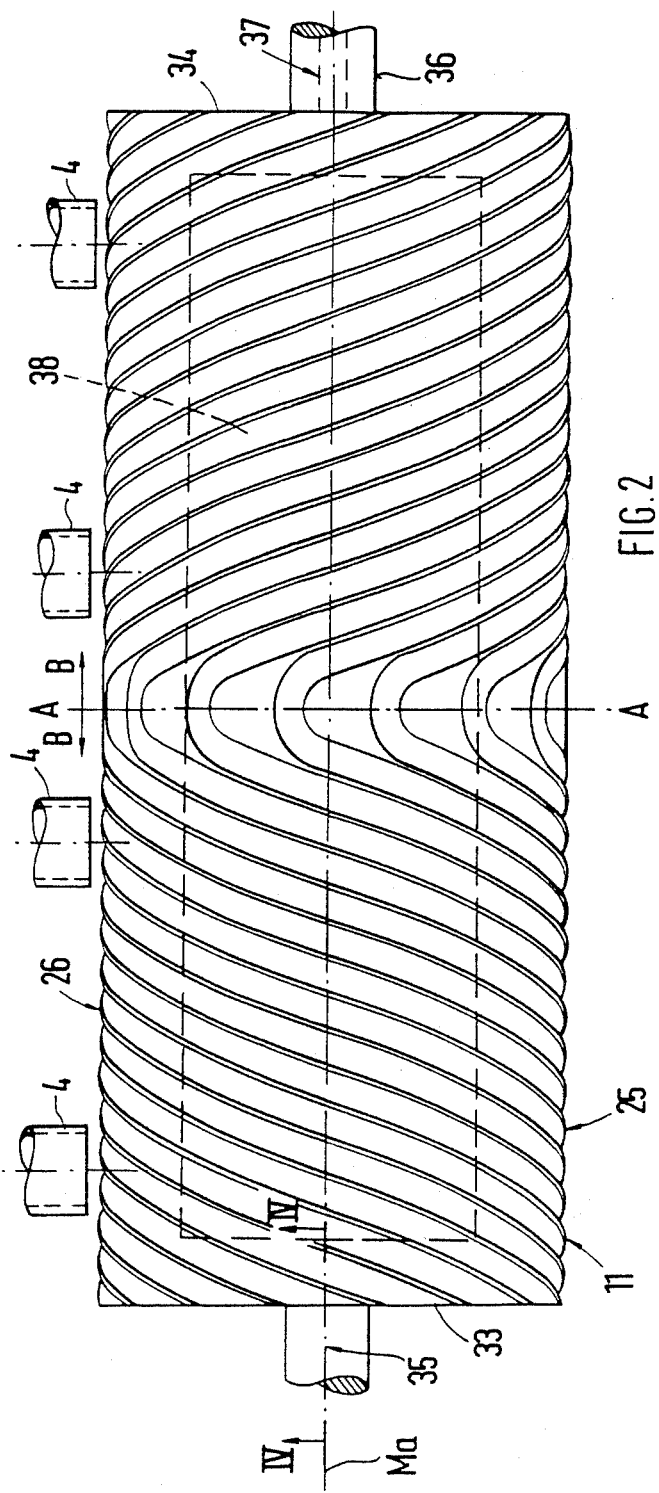
FIG. 2
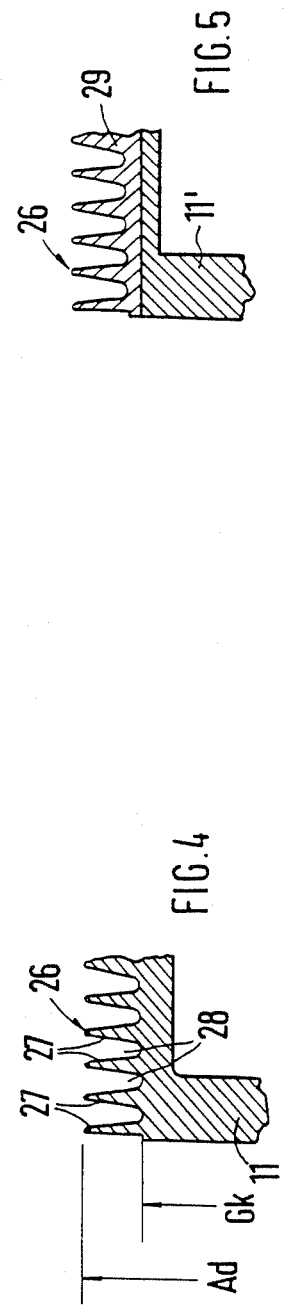
FIG. 5
FIG. 4

WASTE-HEAT TURBINE UNIT

BACKGROUND AND SUMMARY OF THE INVENTION

The invention relates to a waste-heat turbine unit having a rotating cylinder that is formed as a hollow body, the exterior of said cylinder having a blading that is subjected to exhaust gases of an internal-combustion engine that forms a component of a drive assembly, particularly for motor vehicles.

A known waste-heat turbine unit, German Patent (DE-PS) No. 33 26 992, corresponding U.S. Pat. No. 4,590,766 comprises a rotating cylinder, the basic design of which contributes to the fact that the utilization of waste-gas energy in said turbine unit is good.

Nevertheless, it is an objective of the present invention to further develop the cylinder in such a way that its constructive development as well as the effect of the waste-heat turbine unit are improved.

According to the invention, this objective is achieved by means of forming the blading on the cylinder at locations impinged on by the engine exhaust gases so as to extend spirally. In especially preferred embodiments, the blading extends spirally over substantially the whole length of the cylinder and is disposed to be mirror symmetrical with respect to a center transverse plane of the cylinder.

The main advantages achieved by means of the invention are that the spiral blading ensures an optimized heat transfer from the exterior to the interior of the cylinder and thus an even better utilization of energy. Also, because of said blading, the cylinder has a higher stability.

Other objects, advantages and novel features of the present invention will become apparent from the following detailed description of the invention when considered in conjunction with the accompanying drawings.

BRIEF DESCRIPTION OF THE DRAWINGS

FIG. 2 is an enlarged schematic view showing detail X of FIG. 1;

FIG. 4 is a partial sectional schematic view taken along the Line IV—IV of FIG. 2; and FIG. 5 is a sectional view corresponding to FIG. 4 but showing a different embodiment.

DETAILED DESCRIPTION OF THE DRAWINGS

Figure 1:
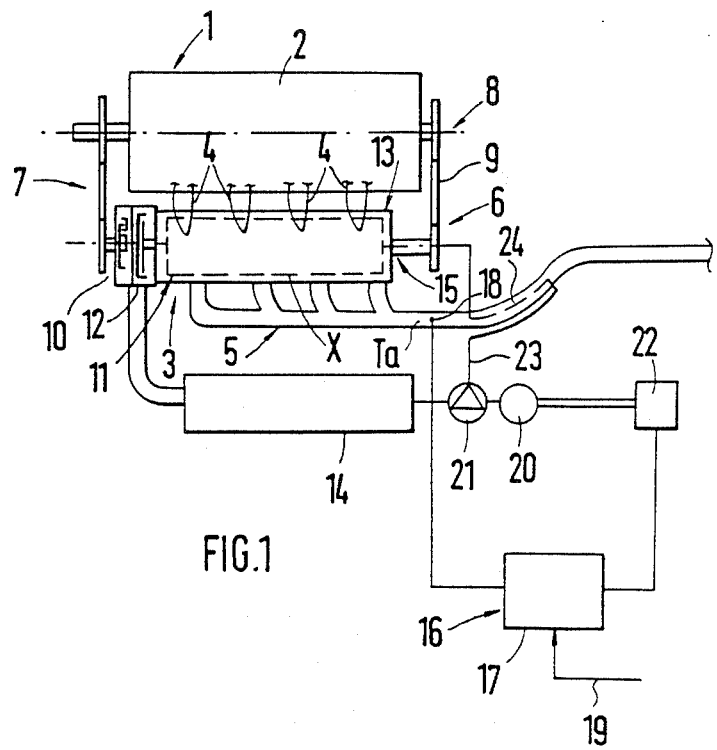
FIG. 1 is a block diagram of a drive assembly with a waste-heat turbine unit constructed according to a preferred embodiment of the invention.

The drive assembly 1, which may be installed into a motor vehicle or may be used for stationary power supply operation, comprises an internal-combustion engine 2 and a waste-heat turbine unit 3. The waste-heat turbine unit 3 is operationally connected to exhaust gas ducts 4 of the internal-combustion engine 2. It is therefore acted upon by exhaust gases of the multi-cylinder internal-combustion engine—which has four cylinders in the illustrated embodiment. Exhaust gas pipe and manifold arrangement 5 is connected behind the waste-heat turbine unit 3.

The waste-heat turbine unit 3 is used for the utilization of the energies that are inherent in the waste gas of the internal-combustion engine, in which case the obtained power—which may be used for a power increase and/or for the reduction of the fuel consumption of the internal-combustion engine 2—is supplied preferably to the crankshaft 8 via drive connections 6 and 7. Transmission connections 9, 10 are provided between the crank shaft 8 and the waste-heat turbine unit 3.

The waste-heat turbine unit 3 comprises a rotating cylinder 11 that is formed as a hollow body with a circular cross-section and a steam turbine unit 12 that is connected behind said cylinder, the steam turbine unit 12 and the cylinder 11 being arranged in a housing 13. A condenser 14 is connected behind the steam turbine unit 12. By means of a device 15, a liquid medium is supplied to the cylinder 11, evaporates, and expands in the steam turbine 12 while supplying power. The liquid medium may be taken from the coolant of the internal-combustion engine. Reference is made to German Patent (DE-PS) No. 33 26 992 and corresponding U.S. Pat. No. 4,590,766 for operating details of the waste-heat turbine unit, particularly, however, of the cylinder 11.

The device 15 interacts with a control system 16. This control system 16 has a control apparatus 17 that is connected with a temperature sensor 18 (actual-value transmitter Ta) in the exhaust gas pipe 5 and a reference value transmitting means 19 that is determined by the power control element of the internal-combustion engine that is not shown. The control apparatus 17 is also connected to an electric motor 20 of a pump 21 by means of a voltage regulator 22.

From the pump 21, a pipe 23 guides a liquid medium to the device 15. The pipe 23, at 24, extends inside the exhaust gas pipe 5; i.e., exhaust gas flows locally around it, whereby the medium is preheated.

The cylinder 11 consists of a light-metal alloy and has a blading 26 at its exterior 25. The blading 26 is formed by spaced ribs 27 (FIG. 4) that extend spirally over preferably the whole length of the cylinder 11. The ribs 27 taper in the shape of a wedge from a base circle Gk to an outer diameter Ad. The base circle Gk and the outer diameter Ad have a joint central longitudinal axis Ma which is also the central longitudinal axis of the cylinder 11. The ribs 27 are formed by milled-out areas 28. The design of the slope of the spiral blading 26 as well as the shape of the ribs 27 and of the milled-out areas 28 is determined mathematically and/or empirically.

According to FIG. 4, the blading 26 is constructed in one piece with the cylinder 11. However, as shown by FIG. 5, the blading 26 may also be formed on component 29 that is built separately from the cylinder 11'. The component 29 is connected with the cylinder 11' in a form-locking and/or frictional material-locking way as required.

The spiral blading 26 is applied at the cylinder 11, 11' in such a way that it extends from the direction of a central transverse plane A—A of the cylinder 11, in a mirror-symmetrical manner, toward the outside—in longitudinal direction B—B of the cylinder.

Figure 3:
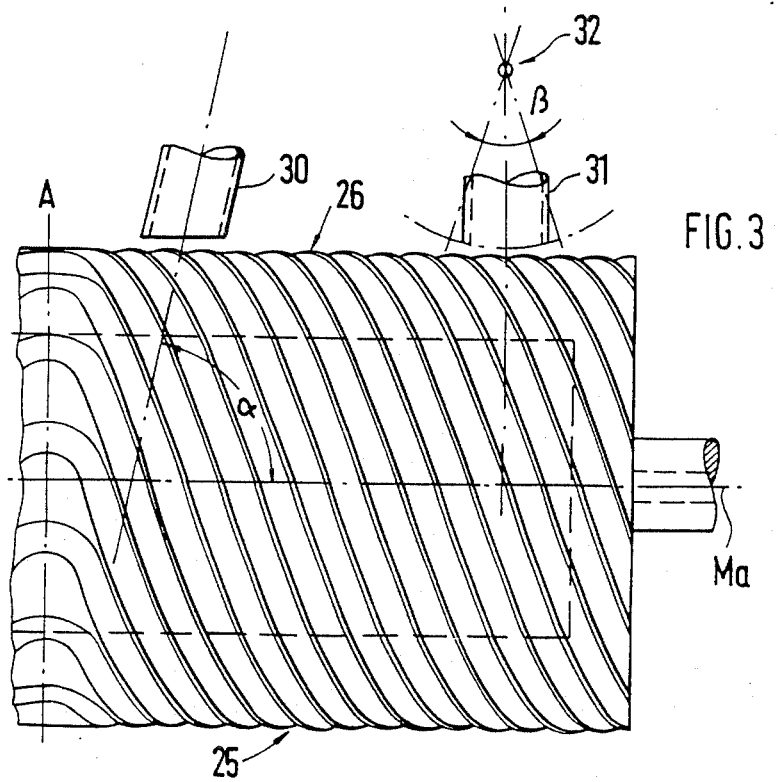
FIG. 3 is a view similar to a part of FIG. 2 but showing another preferred embodiment.

The exhaust gas ducts 4 in FIG. 2 are aligned at a right angle to the central longitudinal axis Ma. However, in certain embodiments, the exhaust gas ducts are arranged at an obtuse angle—angle $\alpha$—with respect to the central longitudinal axis Ma, which in FIG. 3 is shown by means of the exhaust gas duct 30. In addition, embodiments are also contemplated which provide for the possibility of adjusting the angular inclination of waste-gas duct 31 as a function of the rotational speed of the cylinder 11 (11') or of another suitable parameter, namely in the range of angle $\beta$ depicted schematically for the pivotably mounted exhaust gas pipe 32 at the right side of FIG. 3

The cylinder (11 (11'), has bearing shafts 35, 36, at its end faces 33, 34, by means of which it is disposed in a housing 13. The bearing shaft 36 is provided with a bore 37 via which the liquid medium is transported into a hollow space 38 of the cylinder 11 (11').

Although the present invention has been described and illustrated in detail, it is to be clearly understood that the same is by way of illustration and example only, and is not to be taken by way of limitation. The spirit and scope of the present invention are to be limited only by the terms of the appended claims

What is claimed is:

1. In a drive unit including an internal combustion engine and a waste heat turbine unit operated by the exhaust gases of the internal combustion engine for utilizing the energy from the exhaust gases, the waste heat turbine unit comprising a rotatable cylinder member having an exterior and a hollow interior, blading exposed to the exhaust gases and carried on the exterior of the cylinder member, a steam turbine unit, and means for supplying a liquid medium, convertible into steam, to the interior of the cylinder member, the medium being expandable in the steam turbine unit for generating power, wherein the blading extends spirally at the circumference of the cylinder member and extends over at least a substantial portion of the length of the cylinder member.

2. A drive unit according to claim 1, wherein the blading is constructed in one piece with the cylinder member.

3. A drive unit according to claim 1, wherein the blading is formed by a component constructed separately from the cylinder member.

4. A drive unit according to claim 1, wherein at least one exhaust gas duct outlet extends at a right angle with respect to the longitudinal central axis of the cylinder member, said exhaust gas duct outlet directing the exhaust gases against the blading to apply driving forces thereto.

5. A drive unit according to claim 1, wherein at least one exhaust gas duct outlet extends at an obtuse angle with respect to the longitudinal central axis of the cylinder member said exhaust gas duct outlet directing the exhaust gases against the blading to apply driving forces thereto.

6. A drive unit according to claim 1, wherein the exhaust gases are supplied by an exhaust gas pipe opening toward the blading, and wherein the angle of incidence of the exhaust gas pipe is adjustable relative to the blading as a function of the rotational speed of the cylinder member.

7. A drive unit according to claim 1, wherein the blading, in cross-sectional view, is formed by spaced ribs.

8. A drive unit according to claim 7, wherein the ribs taper in a wedge-shape from the direction of a base circle to an outer diameter.

9. A drive unit according to claim 1, wherein a plurality of exhaust gas duct outlets are provided, leading from respective cylinders of multi-cylinder engine to supply the exhaust gases to the blading.

10. A drive unit according to claim 1, wherein the spiral blading extends over the whole length of the cylinder member.

11. A drive unit according to claim 10, wherein the spiral blading extends from the direction of a central transverse plane of the cylinder member, in a mirror symmetrical manner, toward the outside ends of the cylinder member.

12. A drive unit according to claim 11, wherein the blading is constructed in one piece with the cylinder member.

13. A drive unit according to claim 11, wherein the blading is formed by a component constructed separately from the cylinder member.

14. A drive unit according to claim 11, wherein the exhaust gases are supplied by an exhaust gas pipe opening toward the blading, and wherein the angle of incidence of the exhaust gas pipe is adjustable relative to the blading as a function of the rotational speed of the cylinder member.

15. A drive unit according to claim 14, wherein the blading is constructed in one piece with the cylinder member 16. A drive unit according to claim 14, wherein the blading is formed by a component constructed separately from the cylinder member.

17. A drive unit according to claim 11, wherein a plurality of exhaust gas duct outlets are provided, leading from respective cylinders of a multi-cylinder engine to supply the exhaust gases to the blading.

18. A drive unit according to claim 11, wherein the blading, in cross-sectional view, is formed by spaced ribs.

19. A drive unit according to claim 18, wherein the ribs taper in a wedge-shape from the direction of a base circle to an outer diameter.

20. A drive unit according to claim 19, wherein a plurality of exhaust gas duct outlets are provided, leading from respective cylinders of a multi-cylinder engine to supply the exhaust gases to the blading.

* * * * *